United States Patent
Yamaguchi et al.

(10) Patent No.: US 7,373,065 B2
(45) Date of Patent: May 13, 2008

(54) OPTICAL WAVEGUIDE SUBSTRATE AND HARMONICS GENERATING DEVICE

(75) Inventors: Shoichiro Yamaguchi, Ichinomiya (JP); Takashi Yoshino, Ama-Gun (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 11/725,193

(22) Filed: Mar. 16, 2007

(65) Prior Publication Data
US 2007/0189689 A1  Aug. 16, 2007

Related U.S. Application Data

(63) Continuation of application No. PCT/JP05/018987, filed on Oct. 11, 2005.

(30) Foreign Application Priority Data
Oct. 12, 2004  (JP)  ............... 2004-297307

(51) Int. Cl.
*G02B 6/10* (2006.01)
(52) U.S. Cl. .................................... 385/129
(58) Field of Classification Search ......... 385/129–132
See application file for complete search history.

(56) References Cited

U.S. PATENT DOCUMENTS

| 5,274,727 | A | 12/1993 | Ito et al. |
| 5,511,142 | A | 4/1996 | Horie et al. |
| 5,866,200 | A | 2/1999 | Yoshino et al. |
| 5,991,489 | A | 11/1999 | Kondo |
| 6,631,231 | B2 * | 10/2003 | Mizuuchi et al. ........... 385/122 |
| 7,171,094 | B2 | 1/2007 | Mizuuchi et al. |
| 2003/0012540 | A1 | 1/2003 | Kato et al. |
| 2003/0015497 | A1 | 1/2003 | Gill et al. |
| 2003/0223722 | A1 | 12/2003 | Sugita et al. |

FOREIGN PATENT DOCUMENTS

JP  55-115002 A1  9/1980

(Continued)

OTHER PUBLICATIONS

Y. Nishida et al., "*Direct-Bonded QPM-LN Ridge Waveguide with High Damage Resistance at Room Temperature*," Electronics Letters, Apr. 3, 2003, vol. 39, No. 7, pp. 609-611.
Y. Nishida, et al., "*Efficient Wavelength Conversion Using Direct-Bonded QPM-LN Ridge Waveguide*," Conference on Lasers and Electro-Optics, 2003 CLEO 2003, Postconference Direct, Jun. 2003, pp. 1134 to 1135.

(Continued)

*Primary Examiner*—Sarah Song
(74) *Attorney, Agent, or Firm*—Burr & Brown

(57) ABSTRACT

It is provided a structure capable of reducing the loss of incident light propagating in a three-dimensional optical waveguide in a optical waveguide substrate having a ridge type optical waveguide. An optical waveguide substrate has a ferroelectric layer 3 made of a ferroelectric material, a ridge portion formed on a surface of the layer 3 and protrusions provided in both sides of the ridge portion. A three-dimensional optical waveguide is provided in the ridge portion. Alternatively, the substrate has a ridge portion 15 formed on a surface of the layer 3 and step portions provided in both sides of the ridge portion 15 and lower than the ridge portion 15. Grooves 16 are formed in the outsides of the step portions, respectively, and a three-dimensional optical waveguide is provided in the ridge portion 15.

21 Claims, 10 Drawing Sheets

FOREIGN PATENT DOCUMENTS

| | | |
|---|---|---|
| JP | 03-110505 A1 | 5/1991 |
| JP | 04-022904 A1 | 1/1992 |
| JP | 04-335328 A1 | 11/1992 |
| JP | 06-167624 A1 | 6/1994 |
| JP | 09-269430 A1 | 10/1997 |
| JP | 10-239544 A1 | 9/1998 |
| JP | 2002-372641 A1 | 12/2002 |
| JP | 2003-139982 A1 | 5/2003 |
| JP | 2004-145261 A1 | 5/2004 |
| JP | 2004-219751 A1 | 8/2004 |

OTHER PUBLICATIONS

Makoto Minakata et al., "*Dicing Kako ni yoru Ridge-Kata Hikari Doharo Sakusei no Kento II*," 2004 Nen (Heisei 16 Nen) Shuki Dai 65 Kai Extended Abstracts, the Japan Society of Applied Physics, Dai 3 Bunsatsu, Sep. 1, 2004, p. 1055 (Koen Bango 3a-ZM-1).

K. Mizuuchi et al., "*Efficient 340-nm Light Generation By a Ridge-Type Waveguide in a First-Order Periodically Poled MgO:LiNb $O_3$*," Optics Letters, Aug. 1, 2003, vol. 28, No. 15, pp. 1344-1346.

\* cited by examiner

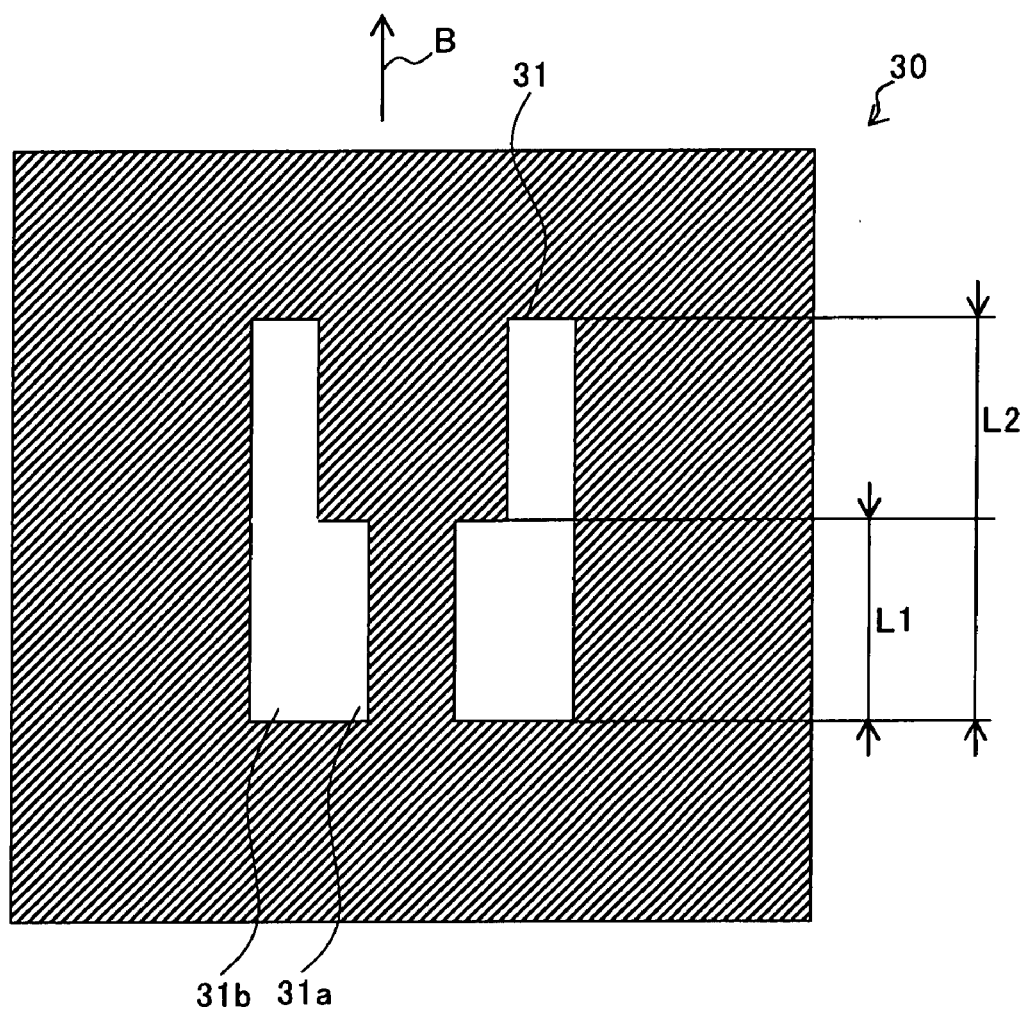

OPTICAL WAVEGUIDE SUBSTRATE AND HARMONICS GENERATING DEVICE

FIELD OF THE INVENTION

The invention relates to an optical waveguide substrate suitable for use in an optical modulator and a device for generating second harmonic wave of quasi-phase matched system.

BACKGROUND ARTS

Recently, it has been studied to develop a device for light modulation by forming an optical waveguide in various kinds of materials. Such devices are to be used in systems for optical communication. Particularly, so-called ridge shaped optical waveguides can improve the confinement of light to provide a high efficiency of controlling light. The waveguide structure has been thus expected as optical modulators, optical switching devices or the like.

Non-linear optical crystals, such as lithium niobate or lithium tantalite, have a high second-order non-linear optical constant. It is thus possible to realize a quasi-phase matched (QPM) type second harmonic generation (SHG) device, by providing a periodic polarization domain inversion structure in the crystal. Further, an SHG device of a high efficiency can be realized by forming a waveguide in the periodic polarization domain inversion structure, and the device finds a wide variety of applications such as optical communication, medical uses, optochemical uses, various optical measurements, etc.

According to the description of Japanese patent publication No. H04-335328A, for producing an optical waveguide in a substrate of a ferroelectric single crystal such as lithium niobate or lithium tantalite, it is formed a liquid phase epitaxial film (LPE film) having a refractive index higher than that of the crystal forming the substrate on the processed surface of the substrate. The liquid phase epitaxial film is processed by dry etching to form a ridge structure, in which light is confined.

Further, the applicant disclosed a process of producing a ridge-shaped optical waveguide used for a device for generating second harmonic wave by subjecting an oxide single crystal to laser ablation, in Japanese Patent laid-Open publication (Kokai) 269, 430/1997. The waveguide is formed by subjecting an oxide single crystal to ablation working using an excimer laser. Such oxide single crystal includes lithium niobate and a lithium niobate-lithium tantalate solid solution.

DISCLOSURE OF THE INVENTION

Optical properties (loss of fundamental light, SHG output of second harmonic wave) were measured in such ridge type optical waveguide. It was thus proved that the loss of fundamental light tends to be larger and SHG output was not so high compared with the theoretical value, although the results depend on the design and conditions.

This is considered as follows. That is, for example, the fundamental light for SHG tends to leak in the horizontal direction to confine the light in the ridge portion and thus to prevent the propagation, so that the loss of the fundamental light is increased.

An object of the present invention is to provide a structure of reducing the propagation loss of incident light in a three-dimensional optical waveguide, in an optical waveguide substrate having a ridge type optical waveguide.

A first invention provides an optical waveguide substrate comprising a ridge portion formed on a surface of a ferroelectric layer comprising a ferroelectric material and protrusions provided in both sides of the ridge portion, respectively, wherein said ridge portion comprises a three-dimensional optical waveguide.

A second invention provides an optical waveguide substrate comprising a ridge portion formed on a surface of a ferroelectric layer comprising a ferroelectric material and step portions provided in both sides of and lower than the ridge portion, respectively, wherein a groove is formed in the outside of each of the step portions, and wherein the ridge portion comprises a three-dimensional optical waveguide.

The present invention further provides a device for oscillating a harmonic wave comprising the optical waveguide substrate and a periodic polarization domain inversion structure formed in the optical waveguide.

The inventors have formed an optical waveguide having a cross section, for example, schematically shown in FIG. 1, and investigated the relationship of the shape and optical properties.

In FIG. 1, a layer 3 of, for example, MgO-doped lithium niobate single crystal and a supporting substrate 1 are adhered with each other by an adhesive layer 2. A pair of elongate grooves 6, substantially parallel with each other, are formed in the layer 3 to form a ridge portion 5 with these grooves. The ridge portion 5 and the grooves 6 together form an optical waveguide structure 4 so that the ridge portion 5 functions as a three-dimensional optical waveguide.

According to such waveguide, it is normally difficult to make side faces 5b and 8 facing the groove 6 perpendicular to a surface 5a, and the side face 5b and 8 are inclined to an axis perpendicular to 5a. Further, a bottom face 7 of the groove 6 is substantially flat.

It is, however, considered that incident light (fundamental light in the case of a harmonic wave oscillating device) tends to be leaked as an arrow "A" under the bottom face 7 to prevent the confinement and propagation of the light in the ridge portion.

In the case of providing grooves 10 in both sides of the ridge portion 5, respectively, the inventors have reached the idea of providing elongate protrusions 11 in the grooves 10, respectively, for example as shown in FIG. 2, based on the above discovery. Such protrusions 11 are formed to define inner grooves 20 so that the leak amount of propagating light in the horizontal direction can be minimized and the confinement of light can be improved.

As the loss of the fundamental light is smaller, the SHG output power tends to be larger. Further, as the confinement of light is stronger, the SHG output is larger to result in a higher output according to the present example.

It was, however, proved that some problems arise in the optical waveguide structure of FIG. 2. That is, tipping may occur at a position where the groove 20 is deep (for example at 22). For example, FIG. 3 is a photograph showing a plan view of a waveguide. Further, FIG. 4 shows an example of an optical waveguide observed at the cross section.

When it is tried to form a deep groove, damage may be induced in the waveguide due to the intolerance of the waveguide against intense laser beam. The waveguide with tipping 22 occured has inferior optical property, extremely large loss of the fundamental light and a low output power of SHG, so that the production yield is lowered.

If the depth D1 of an inner groove 20 is made smaller to prevent the tipping 22, the confinement of propagating light would become weak so that the output of harmonic wave tends to be lowered.

According to the second invention, for example as shown in FIG. 5, a ridge portion 15 is formed on the surface of the layer 3, step portions 25A and 25B are formed in both sides of the ridge portion 15, respectively, groves 16 are formed in the outsides of the step portions, 25A and 25B, respectively, and a three-dimensional optical waveguide is formed in the ridge portion 15.

In this case, step portions 25A and 25B are formed in both sides of a portion 15a having the maximum height "D4" of the ridge portion 15, and the grooves 16 are formed in the outsides of the step portions 25A and 25B, respectively. The tipping due to the processing described above tends to be easily caused as the depth "D4" of the groove 16 is made larger. Further, since the three-dimensional optical waveguide is mainly constituted with the ridge portion 15, light tends to be scattered and the propagation loss of light is increased in the case that tipping occurs in the ridge portion 15 (particularly at its corners 24).

Contrary to this, according to the present invention, since the step portions 25A and 25B are provided adjacent to the portions 15a of the maximum height of the ridge portion, respectively, the height of the step is "D5", which can be made smaller than "D4". The tipping of the central portion 15a of the maximum height (particularly around the corner 24) of the ridge portion 15 can be thus suppressed. As a result, it is possible to reduce the influence of the tipping on the deterioration of the optical property.

On the other hand, the height of the step portion 25A or 25B with respect to the bottom of the groove is (D4-D5). The tipping tends to occur around the step portion 25A or 25B (particularly around the corner 26), as the depth "D4" of the groove 16 is large. The tendency of occurrence of the tipping in the step portions 25A and 25B, however, depends on the height (D4-D5) of the step portion, so that the occurrence of the tipping is suppressed compared with the ridge portion 5 shown in FIG. 2. Moreover, since the corner 26 of the step portion 25A or 25B is distant from the center of the optical waveguide, the tipping would not substantially affect the optical properties if such tipping would occur.

By forming such two or more steps, the depth "D4" of the groove 16 can be made larger to strengthen the confinement of light in the optical waveguide in the direction of width and the tipping in the ridge portion 15 and the loss of the propagating light can be reduced, so that the efficiency of harmonic wave generation can be improved.

Further, in the case that the second invention is applied to the device for generating harmonic wave, the following effects can be obtained. That is, qualitatively, a waveguide having a larger core size is preferred for the fundamental wave having a larger wavelength, and the core size is preferably smaller for the second harmonic wave having a shorter wavelength. By providing the step portions 25A and 25B, the propagation property of the fundamental light can be improved, as well as excellent propagation property of the second harmonic wave can be obtained in the ridge portion 15. The freedom of design of the shape of the optical waveguide can be thus improved compared with the case that the step portions are not provided.

BRIEF DESCRIPTION OF THE DRAWINGS

The patent or application file contains at least one drawing executed in color. Copies of this patent or patent application with color drawing(s) will be provided by the Office upon request and payment of the necessary fee.

FIG. 10 is a plan view showing an example of a mask for forming an optical waveguide substrate 13.

PREFERRED EMBODIMENTS OF CARRYING OUT THE INVENTION

According to the first invention, preferably, the inner grooves are formed between the ridge portions and protrusions, respectively. It is thus possible to further improve the confinement of light in the ridge portion. For example, according to an example shown in FIG. 2, inner grooves 20 are formed between the ridge portions 5 and protrusions 11, respectively.

According to the first invention, preferably, outer grooves are formed in the outsides of the respective protrusions viewed from the ridge portion. It is thus possible to further improve the confinement of light in the direction of width. Further, by providing the inner and outer grooves, it is possible to facilitate the design of reducing the damage due to the processing such as tipping as well as to strengthen the confinement of light by adjusting the depths of the grooves.

Figure 2:
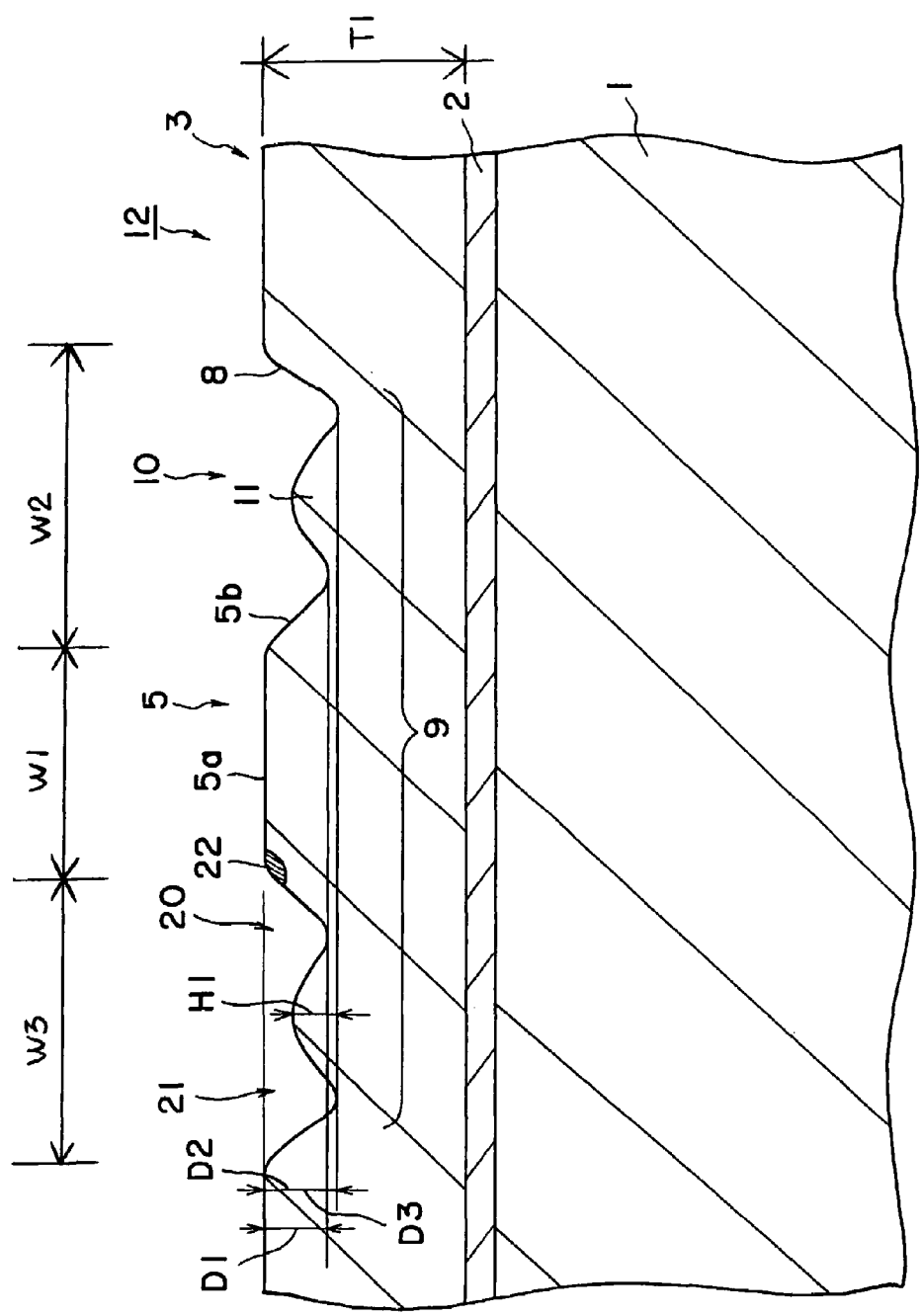
FIG. 2 is a cross sectional view schematically showing an optical waveguide substrate 12 according to a first invention.

According to a preferred embodiment, the outer groove is deeper than the inner groove. For example, as shown in FIG. 2, the depth "D2" of the outer groove 21 is made larger than the depth "D1" of the inner groove 20. By making the depth "D1" of the inner groove 20 smaller, the occurrence of the tipping in the corner 22 of the ridge portion 5 can be reduced. In addition to this, it is possible to improve the confinement of light by making the depth "D2" of the outer groove 21 larger.

According to the first invention, when the depth "D1" of the inner groove 20 is small, the confinement of light in the ridge portion becomes weak to increase the loss of propagating light. On the viewpoint, "D1" may preferably be 1.0 µm or larger and more preferably be 1.5 µm or larger. Further, as the depth "D1" of the inner groove is larger, tipping tends to occur in the ridge portion 5. On the viewpoint, "D1" may preferably be 4 µm or smaller and more preferably be 3 µm or smaller.

According to the first invention, as the depth "D2" of the outer groove 21 is small, the confinement of light in the ridge portion becomes weak and the loss of the propagating light is increased. On the viewpoint, "D2" may preferably be 1.0 µm or larger and more preferably be 1.5 µm or larger.

Further, as the depth "D2" of the outer groove is large, tipping tends to occur in the protrusion 11. On the viewpoint, "D2" may preferably be 4 µm or smaller and more preferably be 3 µm or smaller. Further, in the drawing of FIG. 2, the depth "D3" of the groove 10 is same as the depth "D2" of the outer groove 21.

Although the difference of "D1" and "D2" is not particularly limited, it may preferably be 0.1 µm or more on the viewpoint of the effects described above.

Although the height "H1" of the protrusion 11 is not particularly limited, it may preferably be smaller than the depth "D3" of the groove 10. It is thus possible to reduce the occurrence of tipping in the protrusion 11, and the problem of the confinement of light is not also substantial.

According to the first invention, as the width "W1" of the ridge 5 is large, the confinement of light becomes weak and, in particular, the efficiency of generation of SHG becomes low. On the viewpoint, "W1" may preferably be 6.5 µm or lower and more preferably be 5.5 µm or smaller. On the viewpoint, as the width "W1" of the ridge 5 is small, the confinement of light becomes strong so that multi-mode tends to be oscillated. On the viewpoint, "W1" may preferably be 3 µm or larger and more preferably be 3.5 µm larger.

According to the first invention, as the widths "W2" and "W3" of the groove 10 are smaller, the confinement of light becomes weak so that the loss of propagating light becomes large. On the viewpoint, "W2" and "W3" may preferably be 2 µm or larger and more preferably be 3 µm or larger.

According to the first invention, as the thickness "T1" of the dielectric layer 3 is larger, the confinement of light becomes weak so that the loss of propagating light becomes large. On the viewpoint, "T1" may preferably be 6 µm or lower and more preferably be 5 µm or lower. On the other hand, as "T1" is small, the confinement of light becomes strong so that multi-mode tends to be oscillated. On the viewpoint, "T1" may preferably be 2.5 µm or larger and more preferably be 3 µm or larger.

According to the first invention, preferably, it is provided an underlying adhesive layer 2 adhering the ferroelectric layer and supporting body (refer to FIG. 2).

Figure 6:
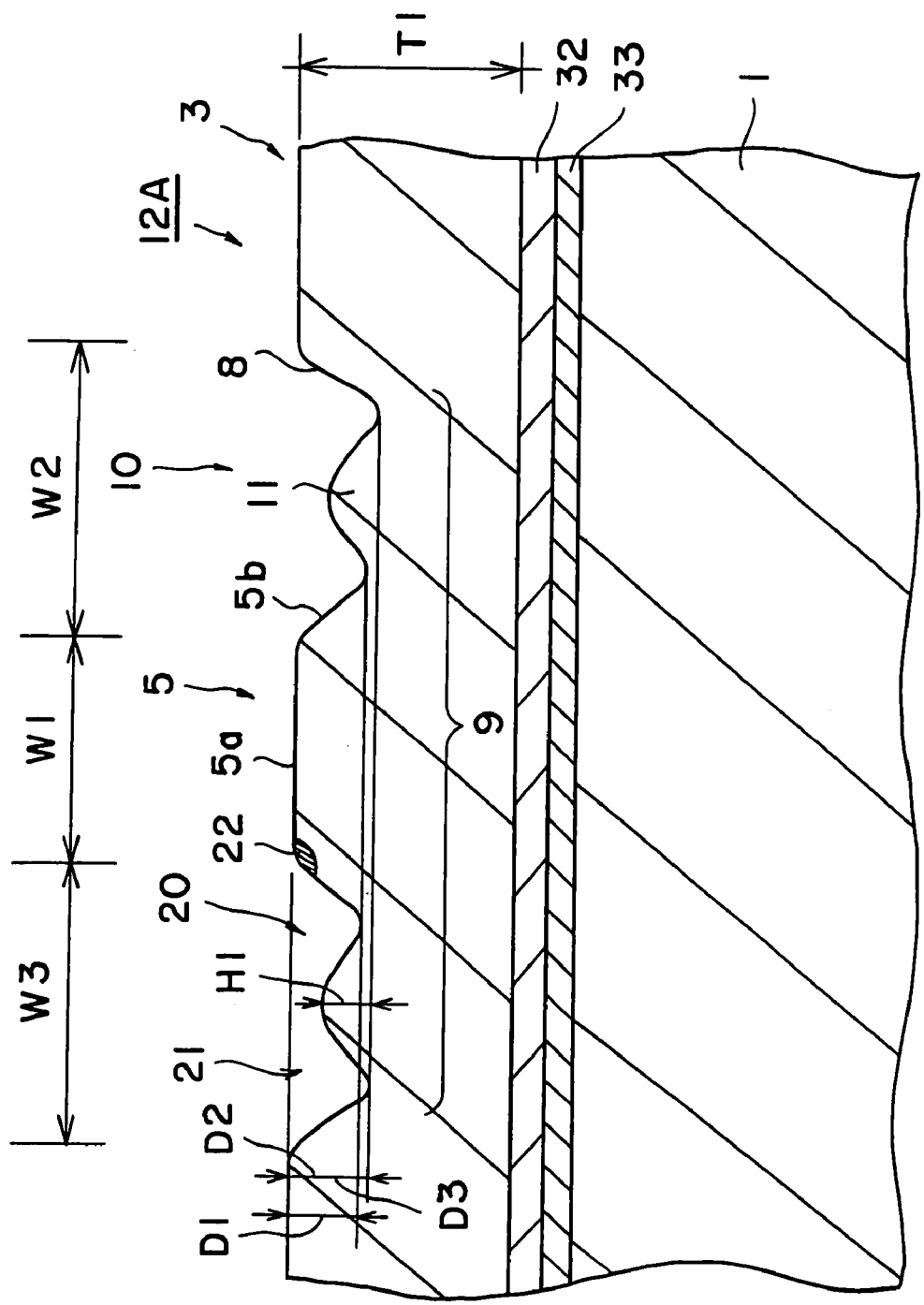
FIG. 6 is a cross sectional view schematically showing an optical waveguide 12A according to another embodiment of the first invention.

According to the first invention, an inorganic adhesive layer is provided in the underlying adhesive layer 2 so that the inorganic adhesive layer 32 contacts the ferroelectric layer. FIG. 6 relates to this embodiment.

A substrate 12A of FIG. 6 is similar to the substrate 12 of FIG. 2, however, the adhesive layer is divided into two layers of an organic adhesive layer 33 and inorganic adhesive layer 32. The inorganic adhesive layer 32 contacts the ferroelectric layer 3.

As described above, by contacting the inorganic adhesive layer with the ferroelectric layer 3, the inorganic adhesive layer functions as a buffer layer so that optical stability is improved.

Further, according to the first invention, a upper substrate covering the side of the surface of the ferroelectric layer may be provided.

Further, according to the first invention, a upper adhesive layer adhering the ferroelectric layer and upper substrate may be provided.

Further, according to the first invention, an inorganic adhesive may contact the ferroelectric layer.

Figure 7:
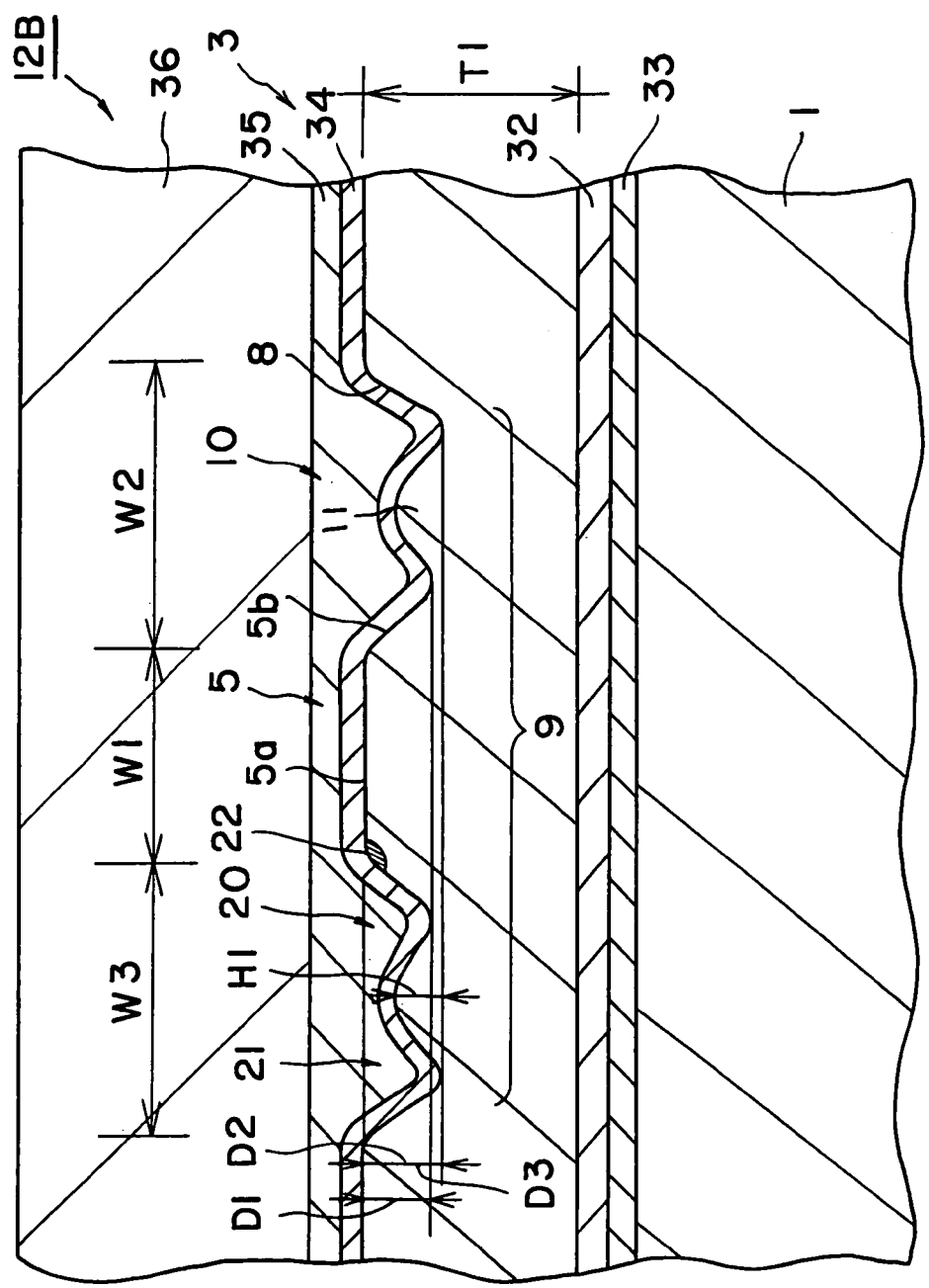
FIG. 7 is a cross sectional view schematically showing an optical waveguide 12B according to another embodiment of the first invention.

FIG. 7 is a cross sectional view schematically showing an optical waveguide substrate 12B according to these embodiments.

In the substrate 12B of FIG. 7, a upper substrate 36 is adhered with a ferroelectric layer 3 through an inorganic adhesive layer 34 and an organic adhesive layer 35. The thickness of the inorganic adhesive layer is substantially constant, and the organic adhesive 35 is filled in a recess of the ferroelectric layer 3.

By providing the upper substrate 36, the optical property and distribution of stress can be made symmetrical in the direction of thickness of the optical waveguide substrate, so that the device can be stabilized against outer disturbances such as temperature or the like.

According to the second invention, as the depth "D5" of the step portion 25A or 25B is small, the confinement of light in the direction of width is weak. On the viewpoint of strengthening the confinement of light, the depth "D5" of the step portion 25A or 25B may preferably be 0.5 µm or larger and more preferably be 1.0 µm or larger. On the other hand, as the depth "D5" of the step portion becomes large, tipping tends to occur in the formation of the ridge portion 15. On the viewpoint, "D5" may preferably be 4 µm or smaller and more preferably be 3 µm or smaller.

According to the second invention, as the depth "D4" of the groove 16 is smaller, the confinement of light in the direction of width becomes weaker. On the viewpoint of strengthening the confinement of light, the depth "D4" of the groove 16 may preferably be 0.5 µm or larger and more preferably be 1.0 µm or larger. On the other hand, as the depth "D4" of the groove 16 is larger, tipping tends to occur in the formation of the step portions 25A and 25B. On the viewpoint, "D4" may preferably be 4 µm or smaller and more preferably be 3 µm or smaller.

According to the second invention, as the width "W4" of the ridge 15 is wider, the confinement of light becomes weaker so that the efficiency of oscillating SHG is low, in particular. On the viewpoint, "W4" preferably be 6.5 µm or smaller and more preferably be 5.5 µm or smaller. On the other hand, as the width "W4" the ridge 5 is narrow, the confinement of light becomes weaker so that multi-mode tends to be oscillated. On the viewpoint, "W4" may preferably 3 µm or larger and more preferably be 3.5 µm or larger.

According to the second invention, if the widths "W5" and "W6" of the step portions 25A and 25B are small, the effects of the present invention would be considerably reduced. On the viewpoint, "W5" and "W6" may preferably be 1 µm or larger and more preferably be 2 µm or larger. On the other hand, if "W5" and "W6" are wide, the confinement of light would become weaker so that the efficiency of SHG oscillation becomes lower. On the viewpoint, "W5" and "W6" may preferably be 4 µm or smaller and more preferably be 3 µm or smaller.

According to the second invention, when the "W7" and "W8", values obtained by subtracting the widths of the step portions 25A and 25B from the widths of the grooves 16, respectively, are small, the confinement of light is weak and the loss of propagating light becomes large. On the viewpoint, "W7" and "W8" may preferably be 1 µm or larger and more preferably be 2 µm or larger.

According to the second invention, as the thickness "T2" of the ferroelectric layer 3 is large, the confinement of light becomes weaker and the loss of the propagating light becomes larger. On the viewpoint, "T2" may preferably be 6 µm or smaller and more preferably be 5 µm or smaller. On the other hand, when "T2" is small, the confinement of light becomes stronger so that multi-mode tends to be oscillated. On the viewpoint, "T2" may preferably be 2.5 µm or larger and more preferably be 3 µm or larger.

Figure 5:
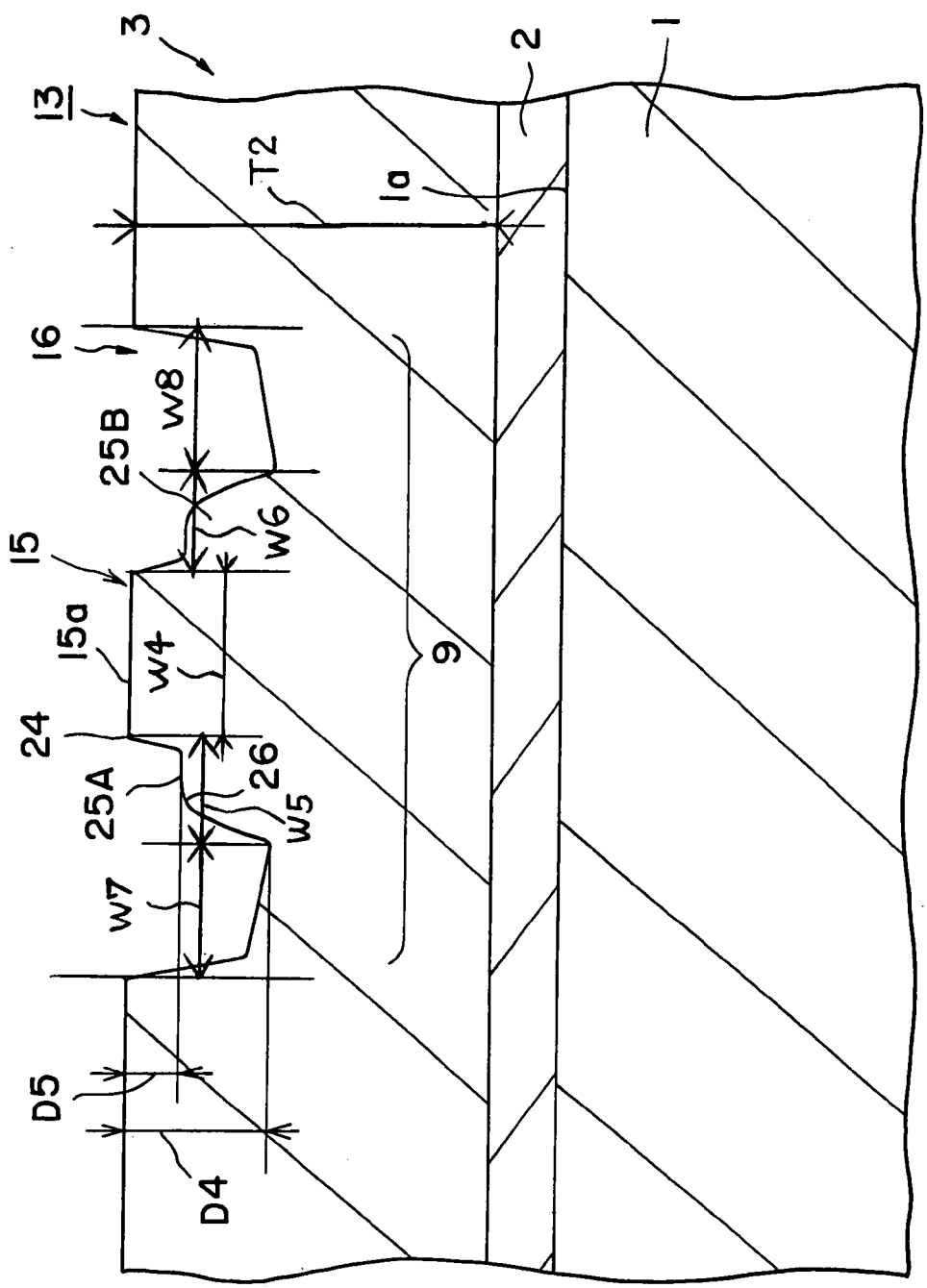
FIG. 5 is a cross sectional view schematically showing an optical waveguide substrate 13 according to an embodiment of the second invention.

According to the second invention, preferably, it is provided an underlying layer 2 adhering the ferroelectric layer and supporting body (refer to FIG. 5).

Figure 8:
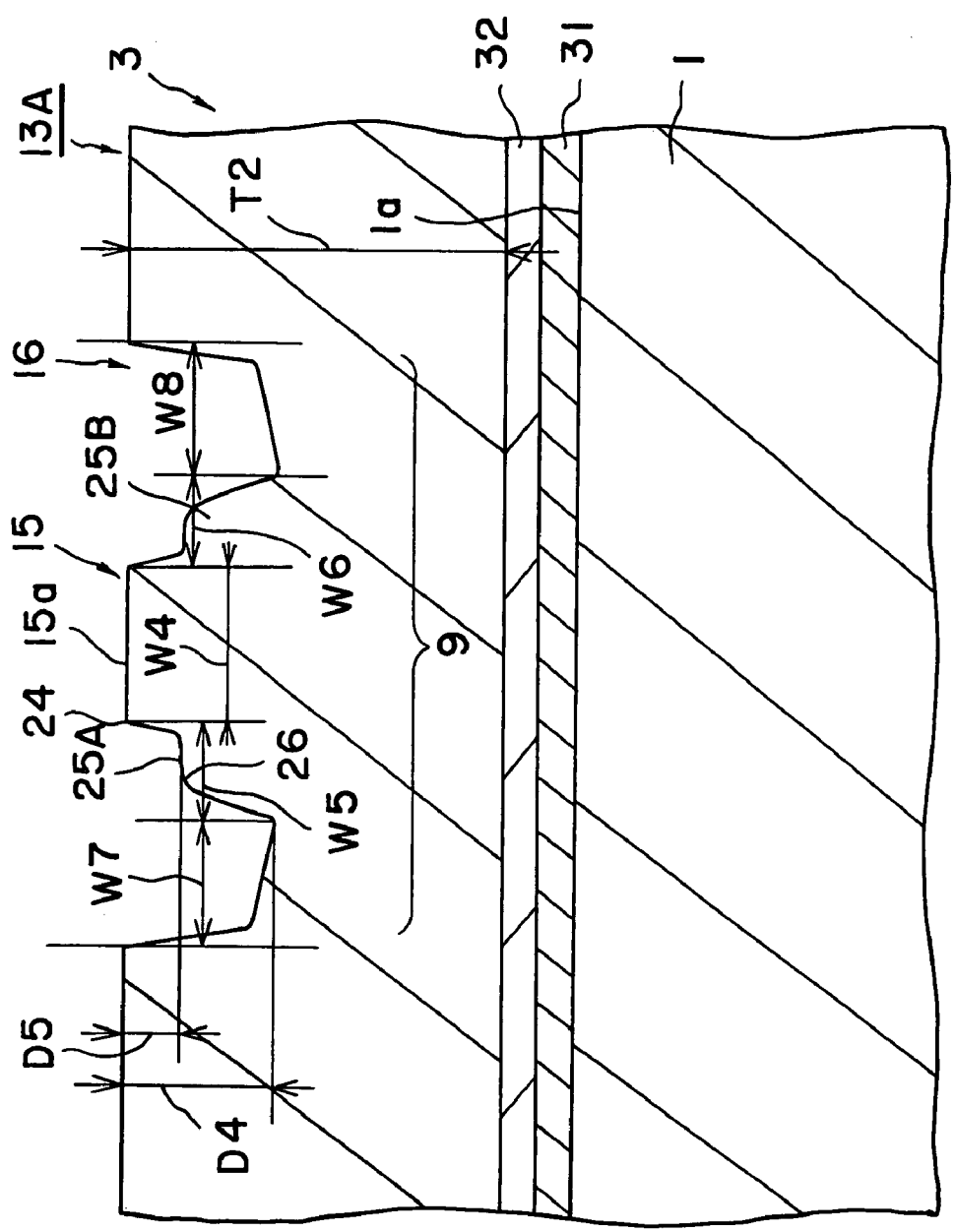
FIG. 8 is a cross sectional view schematically showing an optical waveguide 13A according to another embodiment of the second invention.

According to the second invention, an inorganic adhesive layer may be provided in the underlying adhesive layer 2 so that the inorganic adhesive layer contacts the ferroelectric layer. FIG. 8 relates to this embodiment.

The substrate 13A shown in FIG. 8 is similar to the substrate 13 shown in FIG. 5, except that the adhesive layer is divided into an organic adhesive layer 33 and an inorganic adhesive layer 32. The inorganic adhesive layer 32 contacts the ferroelectric layer 3.

The inorganic adhesive layer is thus contacted with the ferroelectric layer 3 so that the inorganic adhesive layer 32 functions as a buffer layer to result in an improvement of optical stability.

Further, according to the second invention, it may be provided an upper substrate covering the surface side of the ferroelectric layer.

Further, according to the second invention, it may be provided an upper adhesive layer for adhering the ferroelectric layer and the upper substrate.

Further, according to the second invention, the inorganic adhesive may be contacted with the ferroelectric layer.

Figure 9:
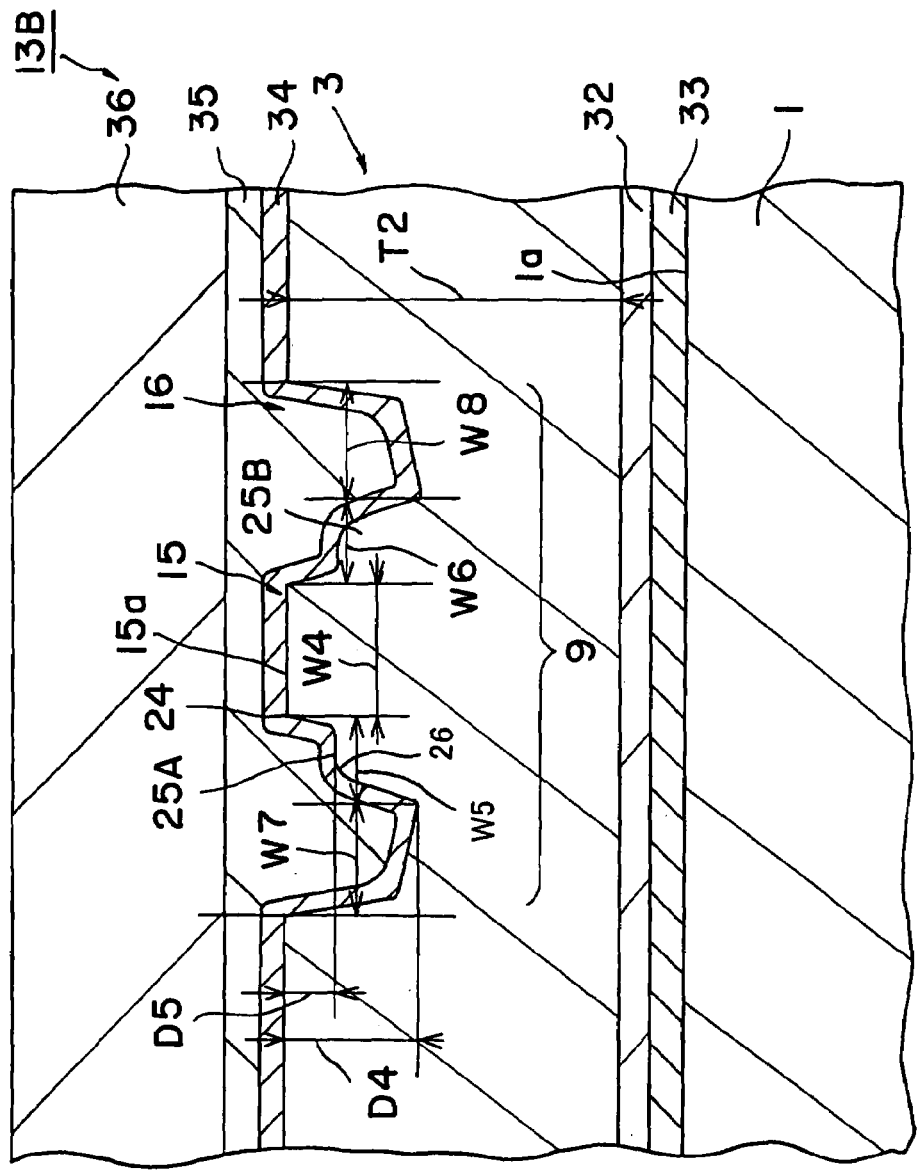
FIG. 9 is a cross sectional view schematically showing an optical waveguide 13B according to another embodiment of the second invention.

FIG. 9 is a cross sectional view schematically showing an optical waveguide substrate 13B according to these embodiments.

According to the substrate 13B of FIG. 9, an upper substrate 36 is adhered onto the ferroelectric layer 3 through an inorganic adhesive layer 34 and an organic adhesive layer 35. The thickness of the inorganic adhesive layer is substantially constant, and the organic adhesive 35 is filled in a recess formed in the ferroelectric layer 3.

By providing the upper substrate 36 as described above, the distribution of optical properties and stress in the direction of thickness of the optical waveguide substrate becomes symmetrical. The device can thus be made stable against outer disturbances such as temperature or the like.

A method for processing the ferroelectric layer for forming the ridge structure is not limited, and includes machining, ion milling, dry etching, laser ablation or the like.

Various kinds of systems may be used as a grinding system. It is now particularly preferred to use a grinding system called precision micro grinder owing to the high mechanical precision. Further, as a method of precision grinding, it may be applied ELID grinding (a method of grinding with dressing owing to electrolyzation). ELID grinding is a grinding process of subjecting a grinder to grinding work while the dressing is performed owing to electrolyzation, so that the processing performance is improved and stabilized. It is described in "Journal of Abrasive Engineering Society" Vo. 39, No. 5, 1995, September, page 2.

Chemical mechanical polishing may be used as a method of finishing by surface grinding.

Alternatively, the machining may be performed by methods such as dicing or the like. According to a preferred embodiment, the groove is formed under the conditions of providing a grinder having a width of 0.1 to 0.2 mm and a mesh number of #200 to 3000 in a dicer, and of operating at a rotational rate of 10000 to 50000 rpm and a feed rate of 50 to 300 mm/min.

Laser ablation is a method of irradiating light of a wavelength or energy comparable with the connection energy between molecules constituting a material to be processed, so that the molecules are dissociated, evaporated and removed. Since this is not a thermal processing, only a laser-irradiated region can be selectively processed without affecting a region surrounding the processed region. It is thus possible to process a ridge structure at a high precision.

The "laser ablation" includes the processing owing to multi photon absorption process and includes the case where thermal effect is slightly observed (Pseudo thermal process).

A difference of the wavelength at absorption edge of a material constituting the ferroelectric layer 3 and that of laser beam may preferably be 100 nm or lower and more preferably be 50 nm or lower. According to this method, the groove can be formed by processing, with laser beam having a wavelength of 150 to 300 nm, ferroelectric layer 3 composed of lithium niobate, lithium tantalite, a solid solution of lithium niobate-lithium tantalite, $K_3Li_2Nb_5O_{15}$ or $La_3Ga_5SiO_{14}$.

As a kind of laser beam for processing, excimer laser and fourth harmonic wave of Nd-YAG laser may preferably be used. A document relating to applications of excimer laser includes a review "Excimer laser in practical uses" in pages 64 to 108 of "O plus E" 1995, November.

According to a preferred embodiment, excimer laser is used to form the groove. In this case, laser of a high intensity of 5 to 10 $J/cm^2$ per an unit area is directly irradiated to perform rough processing of the substrate 3 to a thickness of about 100 μm and laser of a relatively low intensity of 1 to 4 $J/cm^2$ is then used for scanning 10 to 30 times to form the groove. Alternatively, as another method, the substrate 3 is ground and polished to a thickness of about 5 μm to obtain a thin plate, which is then scanned two to three times with laser of a relatively low intensity of 0.5 to 2 $J/cm^2$ to form the groove.

According to the first and second inventions, for example as shown in FIGS. 2 and 5, the ferroelectric layer 3 may be adhered to the supporting body 1 through the adhesive layer 2. Alternatively, the upper substrate may be adhered with the ferroelectric layer through the adhesive layer.

The adhesive may be an inorganic adhesive, an organic adhesive or a combination of an inorganic adhesive and an organic adhesive.

Although specific examples of the organic adhesive is not particularly limited, it may be epoxy resin, a thermosetting resin adhesive, a ultraviolet curable resin adhesive, or "Alon ceramics C" (trade name: Supplied by Toa Gosei Co. Ltd.,) having a thermal expansion coefficient (thermal expansion coefficient of $13 \times 10^{-6}$/K) near that of an electro-optic single crystal such as lithium niobate.

Further, the inorganic adhesive may preferably have a low dielectric constant and an adhesive temperature (working temperature) of about 60° C. Further, it is preferable that a sufficiently high adhesive strength can be obtained during the processing. Specifically, it may preferably be a glass having a composition of one or plural elements of silicon oxide, lead oxide, aluminum oxide, magnesium oxide, calcium oxide, boron oxide or the like.

Further, another inorganic adhesive includes, for example, tantalum pentoxide, titanium oxide, niobium pentoxide and zinc oxide.

The method of forming the inorganic adhesive layer is not particularly limited and includes sputtering, vapor deposition, spin coating, or sol-gel method.

Further, a sheet of an adhesive may be interposed between the ferroelectric layer 3 and supporting body 1 to join them. Preferably, a sheet of a viscous resin adhesive of a thermosetting, photocuring or photothickening resin is interposed between the back face of the ferroelectric layer 3 and the supporting body 1, and the sheet is then cured. Such sheet may appropriate be a resin film having a thickness of 300 μm or smaller.

The material of the supporting body 1 is not particularly limited. According to a preferred embodiment, the minimum value of the thermal expansion coefficient of the supporting body 1 is ⅕ or larger of the minimum value of the thermal expansion coefficient of the ferroelectric layer 3, and the maximum value of the thermal expansion coefficient of the supporting body 1 is 5 times or smaller of the maximum value of the thermal expansion coefficient of the ferroelectric layer 3.

When each of the electro-optic materials forming the ferroelectric layer 3 and supporting body 1 has no anisotropy in thermal expansion coefficient, the minimum and maximum values of the thermal expansion coefficient are the same in each of the ferroelectric layer 3 and supporting body 1. When each of the electro-optic materials forming the ferroelectric layer 3 and supporting body 1 is anisotropic in thermal expansion coefficient, the thermal expansion coefficient may be changed for the respective axes. For example, when the electro-optic material forming the ferroelectric layer 3 is lithium niobate, the thermal expansion coefficients for X axis and Y axis are $16 \times 10^{-6}/°$ C., respectively, which is the maximum value. The thermal expansion coefficient in Z axis is $5 \times 10^{-6}/°$ C., which is the minimum value. Therefore, the minimum value of the thermal expansion coefficient of the supporting body 1 is made $1 \times 10^{-6}/°$ C. or larger, and the maximum value of the thermal expansion coefficient of the supporting body 1 is made $80 \times 10^{-6}/°$ C. or smaller. For example, the thermal expansion coefficient of quartz glass is $0.5 \times 10^{-6}/°$ C. and thus smaller than $1 \times 10^{-6}/°$ C., for example.

On the viewpoint of the advantageous effects of the present invention, the minimum value of thermal expansion coefficient of the supporting body 1 may more preferably be ½ or larger of that of the ferroelectric layer 3. Further, the maximum value of thermal expansion coefficient of the supporting body 1 may more preferably be 2 times or smaller of the maximum value of that of the ferroelectric layer 3.

Specific examples of the material of the supporting body 1 are not particularly limited, as far as the above conditions are satisfied. It includes lithium niobate, lithium tantalate, a glass such as quartz glass, quartz, Si or the like. In this case, the materials of the ferroelectric thin layer and the dielectric layer may preferably be the same on the viewpoint of difference of thermal expansion. The material is most preferably be lithium niobate single crystal.

According to a preferred embodiment, the minimum value of the thermal expansion coefficient of the supporting body 1 is ⅕ or larger of the minimum value of the thermal expansion coefficient of the upper substrate 36, and the maximum value of the thermal expansion coefficient of the supporting body 1 is 5 times or smaller of the maximum value of the thermal expansion coefficient of the upper substrate 36.

When each of the electro-optic materials forming the upper substrate 36 and supporting body 1 has no anisotropy in thermal expansion coefficient, the minimum and maximum values of the thermal expansion coefficient are the same in each of the upper substrate 36 and supporting body 1. When each of the electro-optic materials forming the upper substrate 36 and supporting body 1 is anisotropic in thermal expansion coefficient, the thermal expansion coefficient may be changed for the respective axes.

On the above viewpoint, the minimum value of thermal expansion coefficient of the supporting body 1 may more preferably be ½ or larger of that of the upper substrate 36. Further, the maximum value of thermal expansion coefficient of the supporting body 1 may more preferably be 2 times or smaller of the maximum value of that of the upper substrate 36.

The material of the upper substrate is not particularly limited.

Specific examples of the material of the upper substrate 36 are not particularly limited, as far as the above conditions are satisfied. It includes lithium niobate, lithium tantalate, a glass such as quartz glass, quartz, Si or the like. In this case, the materials of the supporting body and upper substrate may preferably be the same on the viewpoint of thermal expansion. The material is most preferably be lithium niobate single crystal.

Further, the upper substrate may be formed with a material of a high thermal conductivity, such as Si, so that the temperature distribution in the longitudinal direction of the substrate can be uniform and the stability of SHG of a high output power can be improved.

Although the thickness of the upper substrate is not particularly limited, it may preferably be 100 μm or larger on the viewpoint described above. Further, the upper limit of the thickness of the upper substrate is not particularly defined, the thickness may preferably be 2 mm or smaller on the practical view.

EXAMPLES

Comparative Example 1

Figure 1:
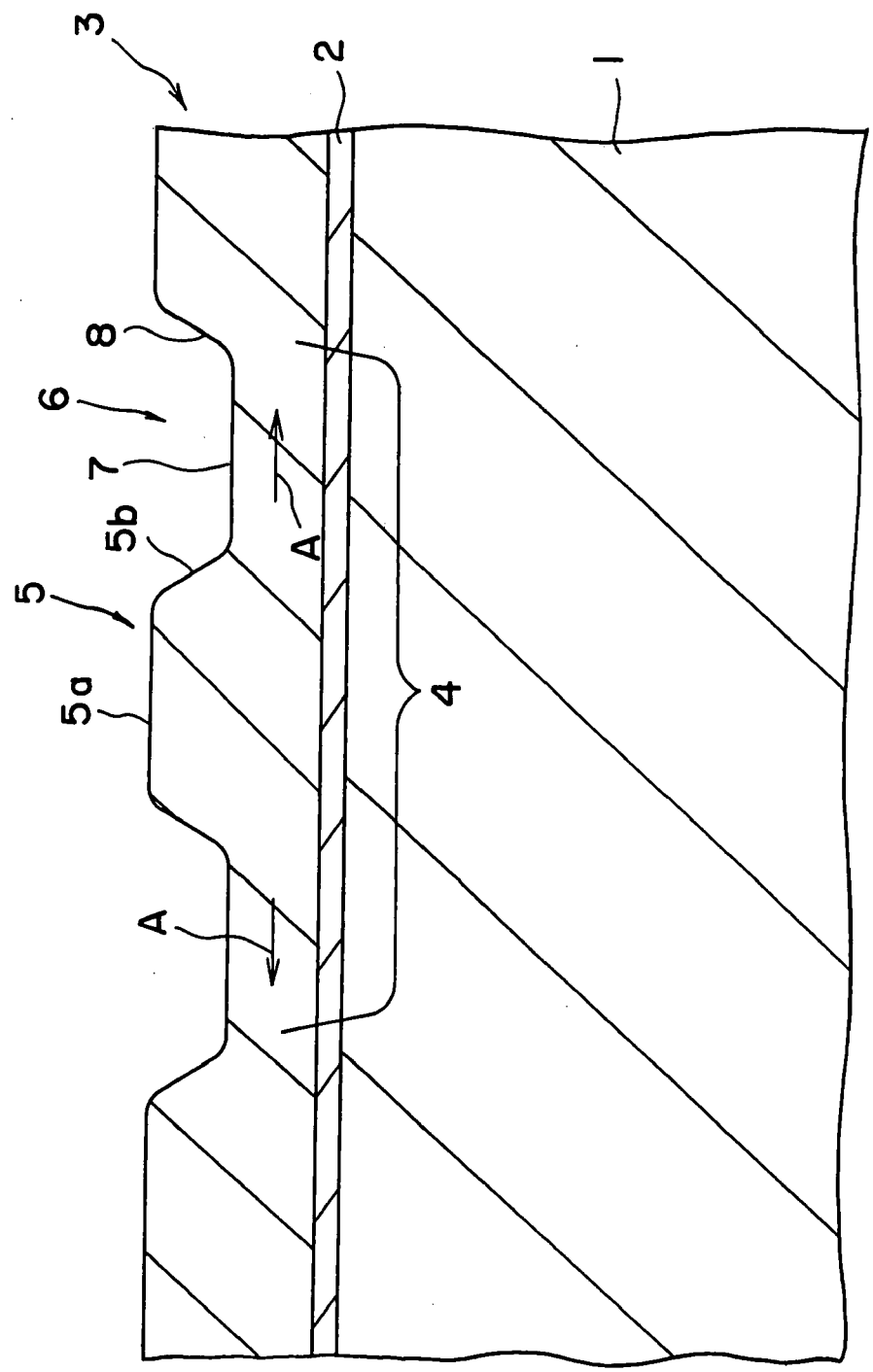
FIG. 1 is a cross sectional view schematically showing an optical waveguide structure of a comparative example.

An optical waveguide substrate shown in FIG. 1 was produced.

Specifically, periodic polarization domain inversion structure having a period of 17.6 μm was produced in a ferroelectric layer 3 having a thickness of 500 μm and made of MgO-doped lithium niobate. The substrate was adhered to a body 1 having a thickness of 1 mm and made of non-doped lithium niobate. The surface of the ferroelectric layer 3 of MgO-doped lithium niobate was ground by grinding and polishing to a thickness of 5 μm. The groove 6 was then formed by laser ablation to provide the shape shown in FIG. 1. In FIG. 1, the width of the ridge portion 5 was 5.5 μm and the depth of the groove 6 was 2 μm. After the processing of the ridge portion, it was produced the device having a length of 45 mm. Both end faces of the device was then polished.

The optical properties (loss of fundamental light, SHG output power) of this waveguide was measured to prove that the loss of the fundamental light was as large as 1.5 dB/cm and the SHG output was 5 μW with respect to an input of 2 mW of the fundamental light. The outputs of the fundamental light inputted into the waveguide and SHG output light were indicated as the values after the Fresnel loss was subtracted. Further, the wavelength of the fundamental light in the waveguide was about 1.56 μm and the wavelength of SHG light was about 0.78 μm.

Example 1

An optical waveguide substrate 12 having the ridge type optical waveguide structure 9 shown in FIG. 2 was produced.

Specifically, periodic polarization domain inversion structure was produced in a ferroelectric layer 3 having a thickness of 500 μm and made of MgO-doped lithium niobate according to the same procedure as the comparative example 1. The ferroelectric layer 3 was adhered to a body 1 having a thickness of 1 mm and made of non-doped lithium niobate. The surface of the substrate of MgO-doped lithium niobate was ground by grinding and polishing to a thickness of 5 μm. The groove 10 was then formed by laser ablation to provide the shape shown in FIG. 2.

The width of the groove depends on the width of the mask. The depth of each portion of the groove depends on the output power of laser beam, scanning rate of the substrate and number of repetition of scanning. In FIG. 2, the width of the ridge portion 5 was 5.5 μm, the depth "D1" of the inner groove 20 was 1.9 μm, both of the depth "D2" of the outer groove 21 and the maximum depth "D3" of the inner groove 10 were 2.2 μm and the height "H1" of the protrusion 11 was 0.8 μm.

The optical properties of the optical waveguide shown in FIG. 2 were evaluated to prove that the loss of the fundamental wave was reduced to 0.8 dB/cm and the SHG output power was improved to 10 μW corresponding with an input of the fundamental wave of 2 mW. Although it is not theoretically clear, it may be speculated that the leakage amount of the fundamental light in the direction of width is reduced and the confinement of light is improved by providing the inner groove 20. As the loss of the fundamental light is lower and the confinement of light is stronger, the SHG output power is larger. A higher output power can be thus obtained.

Figure 3:
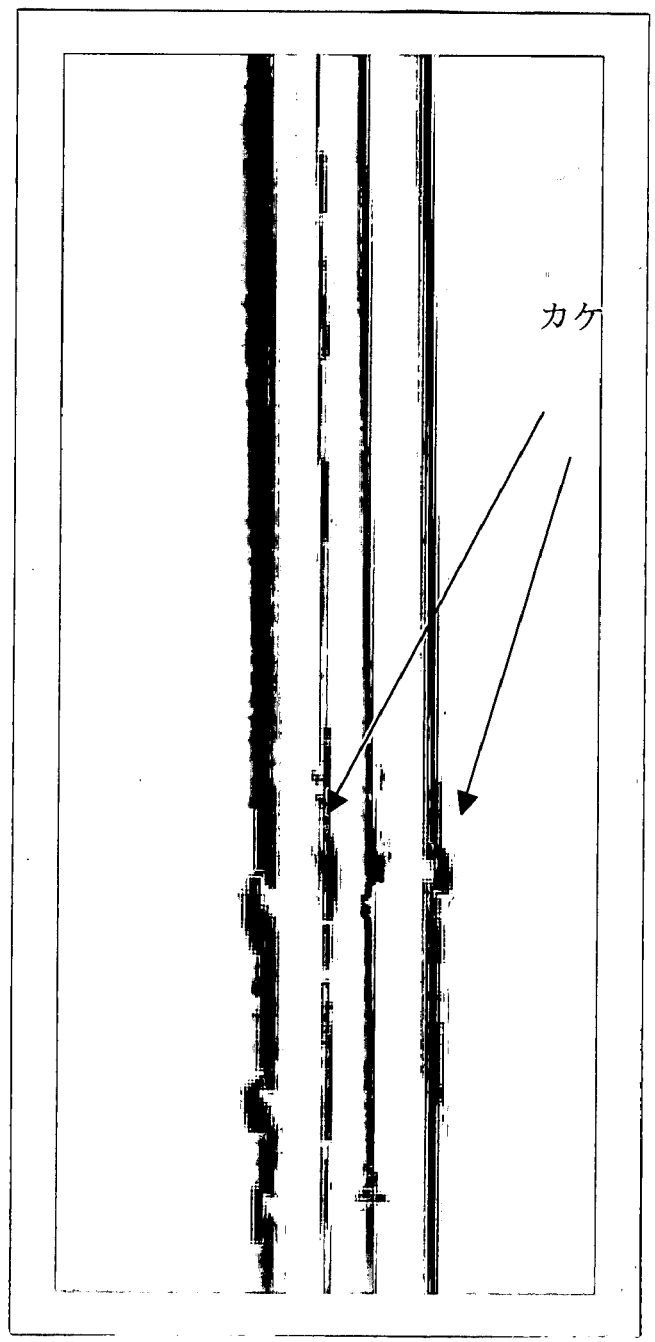
FIG. 3 is a photograph showing the surface of the optical waveguide substrate of FIG. 2, where tipping occurs in the edge of the optical waveguide.
Figure 4:
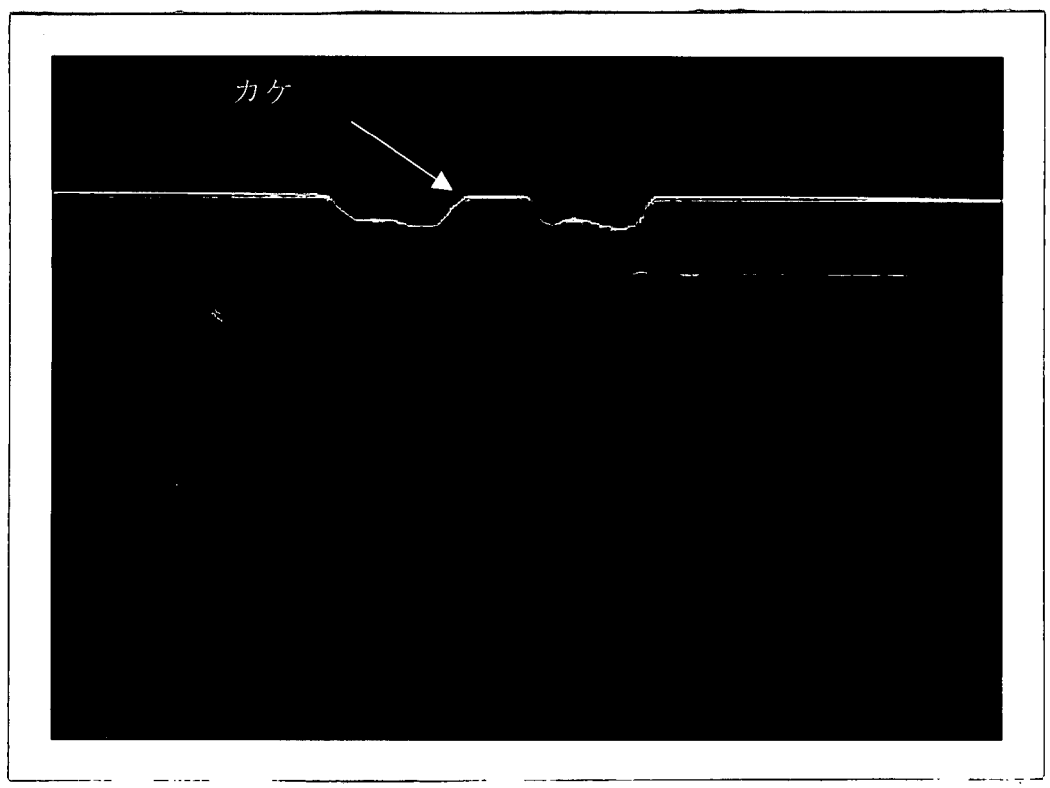
FIG. 4 is a photograph showing a cross section of the optical waveguide substrate of FIG. 2, where tipping occurs in the edge of the optical waveguide.

The tippings, however, may be observed in the production, as shown in FIGS. 3 and 4. FIG. 3 is a photograph showing a plan view of the optical waveguide, and FIG. 4 shows an example of the optical waveguide observed at the cross section. In the case that it is tried to form such deep groove, the substrate may not endure the laser beam of a high intensity to induce damages in the waveguide. The optical properties were deteriorated, the loss of the fundamental wave was extremely high and the SHG output power was low in the optical waveguide with the tipping occurred. Such tipping were generated, for example, in three samples with respect to 10 production samples of the optical waveguide substrate.

Example 2

The optical waveguide substrate shown in FIG. 2 was produced according to the same procedure as the example 1. In FIG. 2, however, the width of the ridge portion 5 was 5.5 μm, the depth "D1" of the inner groove 20 was 1.4 μm, both of the depth "D2" of the outer groove 21 and the maximum depth "D3" of the groove 10 were 1.5 μm, and the height "H1" of the protrusion 11 was 0.6 μm.

The optical properties of the optical waveguide of FIG. 2 were evaluated to prove that the loss of the fundamental light was reduced to 1.2 dB/cm and the SHG output power was improved to 8 μW with respect to an input of 2 mW of the fundamental light. The tipping described above, however, were not observed.

Example 3

An experiment was performed according to the same procedure as described above except that "D1", "D2" and "D3" were variously changed. It was thus proved that "D1" and "D2" are preferably 2 μm or larger for reducing the loss of propagating light and for improving the SHG output power. In this case, however, it is proved that the tipping described above might be generated to result in a reduction of the production yield.

Example 4

The optical waveguide substrate 13 shown in FIG. 5 was produced.

Specifically, periodic polarization domain inversion structure was produced in a substrate having a thickness of 500 μm and made of MgO-doped lithium niobate. The substrate was adhered to a body 1 having a thickness of 1 mm and made of non-dope lithium niobate. The surface of the substrate of MgO-doped lithium niobate was ground by grinding and polishing to a thickness of 5 μm. The groove 16 was then formed by laser ablation to provide the shape shown in FIG. 5.

The width of the groove depends on the width of a mask, and the depth of each portion of the groove depends on the output power of laser beam, scanning rate of the substrate and number of repetition of scanning. For example, it is used a mask 30 having a shape shown in FIG. 6. A pair of openings 31 are formed in the mask 30. Each opening 31 include an opening part 31a having a length "L1" and an opening part 31b having a length of "L2". Each opening 31 corresponds with the groove 16. The length "L1" of the opening 31a is smaller than the length "L2" of the opening 31b.

The mask 30 is moved as an arrow "B" while a light source of the laser beam is fixed. Light transmitted through the opening 31 is irradiated onto the surface of the ferroelectric layer 3. The time "T1" of irradiation of laser beam through the opening part 31a is proportional with the length. "L1", and the time "T2" of irradiation of laser beam through the opening part 31b is proportional with the length "L2". The step portions 25A and 25B having a relatively a small depth of "D5" are formed under the opening part 31, and the groove 16 having a depth of "D4" is formed under the opening 31b.

In the thus obtained optical waveguide substrate, the width of the ridge portion 15 was 5.5 μm, the depths "D5" of the step portions 25A and 25B were 1.0 μm, respectively, the widths of the step portions 25A and 25B were 2 μm, respectively, and the depth "D4" of the step portion was 2.5 μm.

It was thus proved that the propagation loss of the fundamental light was 0.6 dB and the SHG output power was 15 μW with respect to an input of 2 mW of the fundamental light. Further, as to the production yield, the waveguide of a low loss was stably obtained and the deviation of the SHG output power was low owing to the structure of preventing the tipping at the center of the waveguide.

Further, as to damage due to the processing, the tipping was not observed and a high production yield can be obtained owing to the waveguide shape even when the depth "D4" of the groove was increased to about 2.5 μm.

Example 5

The optical waveguide substrate 12B shown in FIG. 7 was produced.

Specifically, periodic polarization domain inversion structure having a period of 17.6 μm was produced in a substrate having a thickness of 500 μm and made of MgO-doped lithium niobate. After an SiO$_2$ film 32 was formed by sputtering on the substrate, the substrate was adhered to a body 1 having a thickness of 1 mm and made of non-dope lithium niobate with an organic adhesive 33. After that, the surface of the substrate of MgO-doped lithium niobate was ground by grinding and polishing to a thickness of 5 μm to form the ferroelectric layer 3. The groove same as that shown in FIG. 1 was then formed by laser ablation.

After a $Ta_2O_5$ film 34 was formed by sputtering on the thus produced optical waveguide, a substrate 36 of non-doped lithium niobate and having a thickness of 0.5 mm was adhered thereto with an organic adhesive 35. The substrate was ground to 100 µm by grinding and polishing.

The optical properties of the optical waveguide substrate (SHG device) 12B were evaluated to prove that the loss of the fundamental light was 0.8 dB/cm comparable with that of the example 1 and the SHG output power was 10 µW with respect to an input of 2 mW of the fundamental light.

Further, a test was performed for evaluating the long-term operation of the optical waveguide substrate to prove that a reduction of the SHG output power was not observed over 30000 hours, which is three times of that of a prior structure.

Further, the optical waveguide substrate 13B shown in FIG. 9 was produced as described above, and similar results were obtained.

Example 6

The optical waveguide substrate 12B shown in FIG. 7 was produced.

Specifically, periodic polarization domain inversion structure having a period of 6.57 µm was produced in a substrate having a thickness of 500 µm and made of MgO-doped lithium niobate. After an $SiO_2$ film 32 was formed by sputtering on the substrate surface, the substrate was adhered, to a body 1 having a thickness of 1 mm and made of non-dope lithium niobate with an organic adhesive 33. After that, the surface of the substrate of MgO-doped lithium niobate was ground by grinding and polishing to a thickness of 3.7 µm to obtain the ferroelectric layer 3. The groove, same as that of the example 1, was then formed by laser ablation.

After a $Ta_2O_5$ film 34 was formed by sputtering on the thus produced optical waveguide, an Si body 36 having a thickness of 0.5 mm was adhered thereto with an organic adhesive 35.

The optical properties of the optical waveguide substrate (SHG device) were evaluated to prove that the loss of the fundamental light was 0.8 dB/cm and the SHG output power was 20 µW with respect to an input of 100 mW of the fundamental light.

Further, a test was performed for evaluating high power operation of the device to prove that it was obtained an SHG output power of 500 mW, which was twice of that obtained in a prior structure.

Further, the optical waveguide substrate 13B shown in FIG. 9 was produced as described above, and similar results were obtained.

In the case that it is desired to oscillate SHG light having a shorter wavelength, the size of the waveguide is preferably made smaller. As to the thickness of the substrate, the thickness of the substrate portion is preferably about 3.5 µm when the wavelength of the fundamental light is about 1 µm. Contrary to this, in the case that SHG having a longer wavelength is to be oscillated, the thickness of the substrate portion may preferably be increased to 6 or 7 µm.

The invention claimed is:

1. An optical waveguide substrate comprising a ridge portion and outer plateaus on either side of said ridge portion formed on a surface of a ferroelectric layer comprising a ferroelectric material, and further comprising protrusions in both sides of said ridge portion, wherein a three-dimensional optical waveguide is provided in said ridge portion.

2. The optical waveguide substrate of claim 1, wherein inner grooves are formed between said ridge portion and said protrusions, respectively.

3. The optical substrate of claim 2, wherein outer grooves are formed in the outsides of said protrusions, respectively, with respect to said ridge portion.

4. The optical waveguide substrate of claim 3, wherein said outer groove is deeper than said inner groove.

5. The optical waveguide substrate of claim 1, further comprising a supporting body for supporting a bottom of said ferroelectric layer.

6. The optical substrate of claim 5, further comprising an underlying adhesive layer adhering said ferroelectric layer and said supporting body.

7. The optical substrate of claim 6, wherein said underlying adhesive layer comprises an inorganic adhesive contacting said ferroelectric layer.

8. The optical waveguide substrate of claim 5, further comprising an upper substrate covering said surface of said ferroelectric layer.

9. The optical waveguide substrate of claim 8, further comprising a upper adhesive layer for adhering said ferroelectric layer and said upper substrate.

10. The optical waveguide substrate of claim 9, wherein said upper adhesive layer comprises an inorganic adhesive contacting said ferroelectric layer.

11. The optical waveguide substrate of claim 5, wherein the minimum value of the thermal expansion coefficient of said supporting body is ⅕ or higher of the minimum value of the thermal expansion coefficient of said ferroelectric layer, and wherein the maximum value of the thermal expansion coefficient of said supporting body is 5 times or lower of the maximum value of the thermal expansion coefficient of said ferroelectric layer.

12. A device for oscillating a harmonic wave, said device comprising the optical waveguide substrate of claim 1 and a periodic polarization domain inversion structure formed in said optical waveguide.

13. An optical waveguide substrate comprising a ridge portion and outer plateaus on either side of said ridge portion formed on a surface of a ferroelectric layer comprising a ferroelectric material and further comprising step portions provided in both sides of said ridge portion, respectively, and lower than said ridge portion, wherein grooves are formed in the outsides of said step portions, respectively, and wherein a three-dimensional optical waveguide is provided in said ridge portion.

14. The optical waveguide substrate of claim 13, comprising a supporting body supporting a bottom face of said ferroelectric layer.

15. The optical waveguide substrate of claim 14, wherein the minimum value of the thermal expansion coefficient of said supporting body is ⅕ or higher of the minimum value of the thermal expansion coefficient of said ferroelectric layer, and wherein the maximum value of the thermal expansion coefficient of said supporting body is 5 times or lower of the maximum value of the thermal expansion coefficient of said ferroelectric layer.

16. The optical waveguide of claim 14, further comprising an underlying adhesive layer adhering said ferroelectric layer and said supporting body.

17. The optical waveguide substrate of claim 16, wherein said underlying adhesive layer comprises an inorganic adhesive contacting said ferroelectric layer.

18. The optical waveguide substrate of claim 14, further comprising an upper substrate covering said surface of said ferroelectric layer.

19. The optical waveguide substrate of claim 18, further comprising an upper adhesive layer adhering said ferroelectric layer and said upper substrate.

20. The optical waveguide substrate of claim 19, wherein said upper adhesive layer comprises an inorganic adhesive contacting said ferroelectric layer.

21. A device for oscillating a harmonic wave, said device comprising the optical waveguide substrate of claim 13 and a periodic polarization domain inversion structure formed in said optical waveguide.

* * * * *